Figure 1:
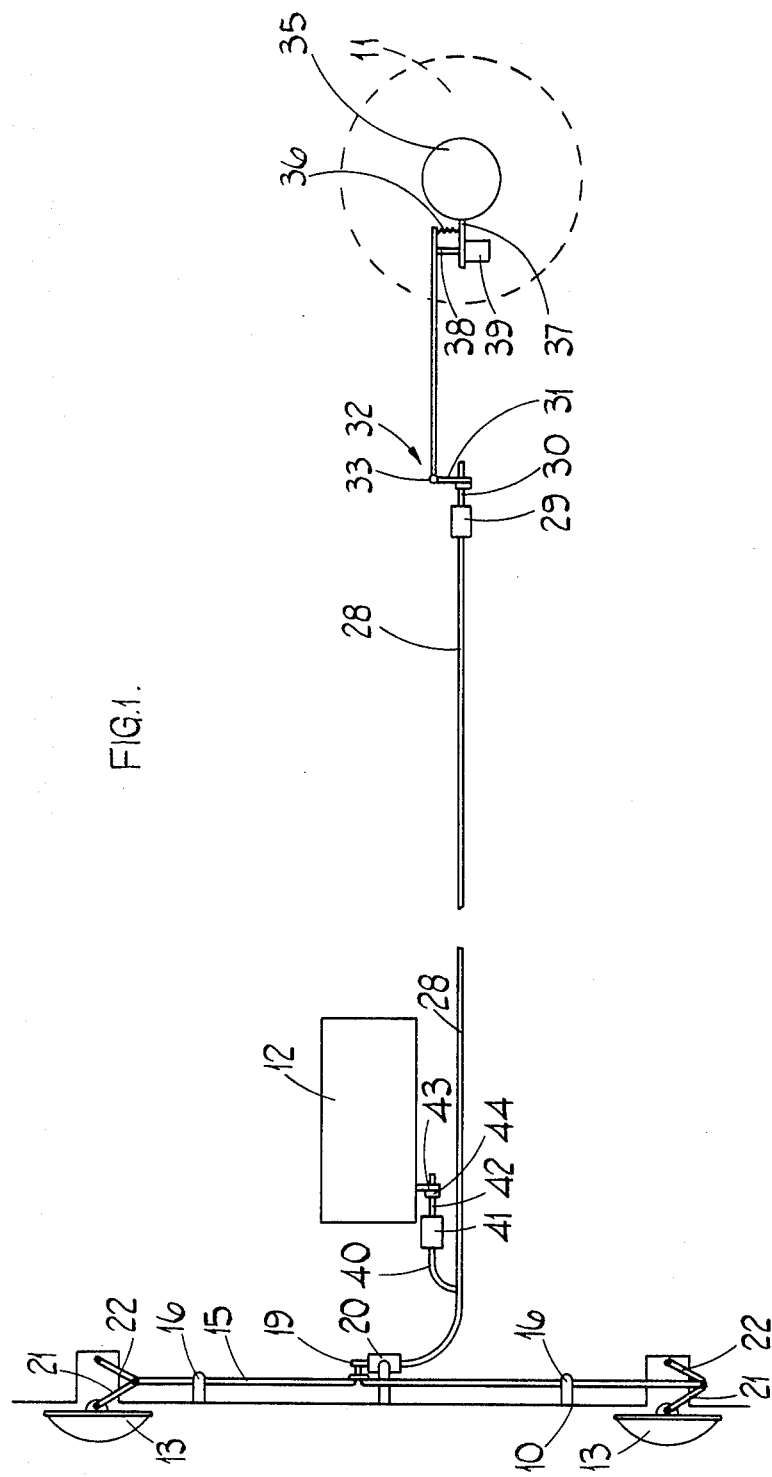

United States Patent [19]

Martin

[11] 4,027,149
[45] May 31, 1977

[54] MOTOR VEHICLE WITH TILTABLE HEADLAMPS

[75] Inventor: Frederick Raymond Patrick Martin, Bromley, England

[73] Assignee: The Lucas Electrical Company Limited, Birmingham, England

[22] Filed: Jan. 31, 1975

[21] Appl. No.: 545,883

[30] Foreign Application Priority Data

Feb. 6, 1974 United Kingdom ............ 5457/74

[52] U.S. Cl. .......................... 240/7.1 LJ; 240/61.8
[51] Int. Cl.² .......................................... B60Q 1/10
[58] Field of Search ............ 240/7.1 LJ, 61.1, 61.2, 240/61.5, 61.6, 61.7, 61.8

[56] References Cited

UNITED STATES PATENTS

| | | | |
|---|---|---|---|
| 1,240,780 | 9/1917 | Pratt | 240/62.74 |
| 1,240,784 | 9/1917 | Sears | 240/62.74 |
| 1,634,043 | 6/1927 | Pierce | 240/61.8 |
| 3,328,571 | 6/1967 | Cibie | 240/7.1 LJ |
| 3,370,162 | 2/1968 | Biabaud | 240/62.3 X |
| 3,415,983 | 12/1968 | McGee | 240/62.3 X |
| 3,453,424 | 7/1969 | Cibie | 240/61.1 |
| 3,603,785 | 9/1971 | Solihull | 240/62.3 X |
| 3,614,416 | 10/1971 | Fleury | 240/7.1 LJ |

Primary Examiner—L. T. Hix
Assistant Examiner—Alan Mathews

[57] ABSTRACT

A motor vehicle has a pair of vertically tiltable headlamps mounted on the vehicle body. An elongate rod extends horizontally between the two headlamps and is slidable in bushes fixed to the motor vehicle body. The elongate rod is connected at its respective ends to the headlamps by way of respective pairs of links disposed on opposite sides of the rod. One link of each pair is pivotally connected between the rod and the respective headlamp whilst the other rod of each pair is pivotally connected between the rod and the body. Movement of the rod effects simultaneous movement of the headlamps and is effected by a mechanical/hydraulic system linked to a rear axle housing and an engine of the motor vehicle so that headlamp tilting occurs to compensate for tilting of the body under changing conditions of load, acceleration and braking.

6 Claims, 5 Drawing Figures

MOTOR VEHICLE WITH TILTABLE HEADLAMPS

This invention relates to a motor vehicle with tiltable headlamps and is particularly, though not exclusively, concerned with such a motor vehicle in which the headlamps can be tilted in accordance with changes in the attitude of a body of the vehicle relative to wheels thereof to maintain light beams emanating from the headlamps in use at substantially the desired level.

It has previously been proposed to provide tiltable headlamps on a motor vehicle by mounting the headlamps on a rod extending transversely of the motor vehicle and adjacent the front thereof, said rod being angularly movable about its longitudinal axis in order to effect tilting of the headlamps in a vertical plane. Such an arrangement provides a perfectly suitable system but it is not always possible to incorporate such a system on a motor vehicle because of the design thereof.

It is an object of the present invention to provide a different system from that described above, which system might be capable of use where an angularly movable cross-rod common to the two headlamps is not possible.

According to the present invention, there is provided a motor vehicle including a vehicle body, a pair of transversely spaced headlamps mounted on the body for pivotal movement in a vertical plane, and means for effecting pivotal movement of said headlamps, said means including an elongate element extending between said headlamps and longitudinally slidable relative to the vehicle body, said means further including a linkage attached to each end of said elongate element and to an adjacent one of the pair of headlamps, said linkages being arranged so that longitudinal movement of the element causes simultaneous pivotal movement of said headlamps.

Preferably, the means for effecting pivotal movement of said headlamps includes a transducer having a mechanical output operably connected with said element, said transducer having a hydraulic input.

Conveniently, the transducer includes a housing within which is disposed a reservoir having a flexible wall, an inlet to said reservoir defining said hydraulic input, and said output comprises a rod extending into said housing and slidable relative thereto in response to flexure of said flexible wall.

The hydraulic input may be arranged to be fed with hydraulic signals corresponding to the attitude of the vehicle body relative to the wheels thereof so as to maintain light beams emanating from the headlamps in use at substantially the desired level. Such signals may be derived by employing a sensor which senses the position of the rear of the vehicle body relative to rear wheels of the vehicle or may be a combination of the output of such a sensor and the output of a sensor which senses the position of a mass movable longitudinally relative to the body under conditions of acceleration and deceleration.

Figure 2:
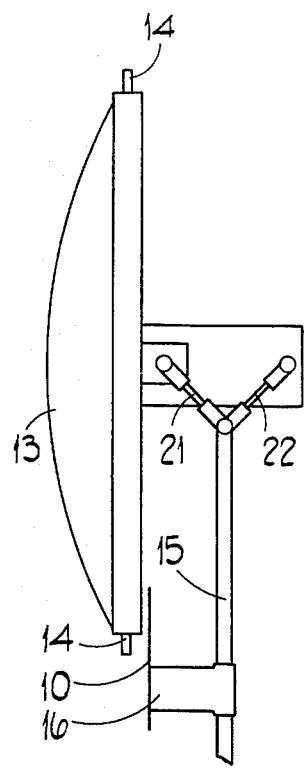
Figure 3:
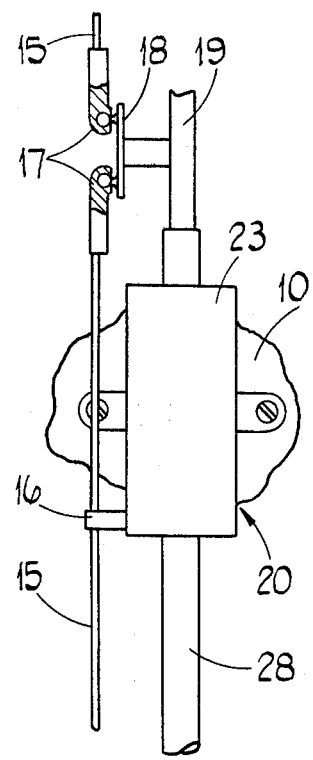
Figure 5:
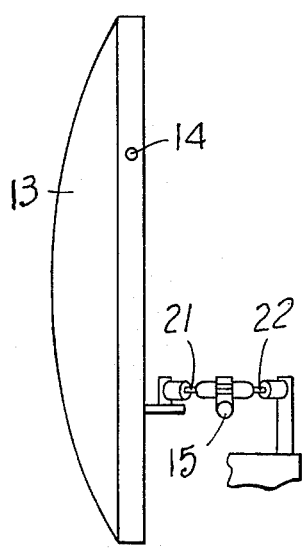
Figure 4:
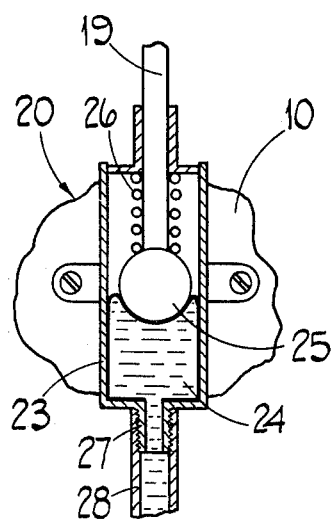

An embodiment of the present invention will now be described, by way of example, with reference to the accompanying, in which:

FIG. 1 is a very schematic diagram of part of a motor vehicle according to the present invention in which headlamps thereon are pivotal in a vertical plane, the right hand part of FIG. 1 being turned through 90° relative to the left hand part of FIG. 1, FIG. 2 is a plan view of part of the motor vehicle illustrated in FIG. 1, FIG. 3 is a plan view of another part of the vehicle of FIG. 1, FIG. 4 is a longitudinal sectional view of a transducer illustrated in FIG. 3, and FIG. 5 is a side view of apparatus of FIG. 2.

Referring to the drawing, the motor vehicle includes a vehicle body 10 (only illustrated partly in the drawing) mounted by means of a suspension (not shown) on four wheels 11 (only one rear wheel being illustrated). An engine 12 is resiliently mounted in the body 10 and a pair of transversely spaced headlamps 13 are mounted on the body for pivotal movement in a vertical plane about respective pivots 14 (see FIG. 2). The motor vehicle further includes means for effecting pivotal movement of the headlamps 13 about their respective pivots 14. Such means comprises an elongate rod 15 which is disposed dispoed and mounted in bushes 16 fixed relative to the body 10 for axial sliding movement transversely of the body 10. In this embodiment, the rod 15 is split intermediate its ends and its split ends are connected by means of respective ball and socket joints 17 to a plate 18 fixedly supported on an output rod 19 of a transducer 20. At each end, the rod 15 is pivotally attached to a pair of links 21 and 22 disposed on opposite sides of the rod 15. Each link 21 is pivotally attached to the respective headlamp 13 at a location which is spaced from the pivots 14. Each link 22 is pivotally attached to the body 10 at a location which is spaced directly behind the attachment of the respective link 21 with the respective headlamp 13. It will be manifest that axial sliding movement of rod 15 relative to vehicle body 10 will cause the headlamps 13 to move simultaneously, and in the same direction, about their pivot axes 14.

The transducer 20 comprises a housing 23, a flexible walled reservoir 24 carried within the housing 23, and a ball 25 engaged with said reservoir 24 and carrying said output rod 19. A spring 26 lodged between the ball 25 and the housing 23 serves to urge the ball 25 into engagement with the flexible walled reservoir 24. The reservoir 24 is provided with a hydraulic inlet 27 with which is connected a tube 28. The tube 28 extends rearwardly of the vehicle body 10 to a further transducer 29 also fixed relative to the vehicle body 10. The further transducer 29 is identical to the transducer 20 except that it is not provided with a spring equivalent to spring 26. The further transducer 29 is provided with a mechanical input rod 30 slidably received in an arm 31 of a lever 32 pivotally mounted on the body 10 at 33. The lever 32 is cranked and has an elongate arm 34 which projects rearwardly of the vehicle towards a rear axle housing 35 of the vehicle. A tension spring 36 disposed between and connected to the arm 34 and a bracket 37 secured to the rear axle housing 35 urges the arm 34 into engagement with an output rod 38 of a temperature sensitive unit 39 mounted on the bracket 37. The construction and operation of the temperature sensitive unit, lever 32 and tension spring 36 is described in detail in our copending British Patent Application No. 5456/74. (our case no. 8 LE 1434 ) entitled "MOTOR VEHICLES INCLUDING HEADLAMP TILTING MECHANISMS." Consequently, the operation of this arrangement will not be described in any detail here except to say that when the rear of the motor vehicle body 10 is loaded, the lever 32 moves in an anti-clockwise direction about pivot 33 and permits the pressure within tube 28 to be reduced. Conversely, when the load on the rear of the motor vehicle is lightened, the lever 32 moves in a clockwise direction about pivot 33 and causes the pressure within tube 28 to be increased. The amount of increase or decrease, as the case may be, within tube 28 is related to the amount of load on the rear of the motor vehicle body. The temperature sensitive unit 39 is provided for compensating for changes in the pressure within tube 28 due to changes in ambient temperature. Again, the operation of this unit 39 is fully disclosed in our above mentioned co-pending British Patent Application and will be described in no further detail in this Application.

Adjacent engine 12 is a further tube 40 branches from tube 28 and leads to transducer 41 which is identical to the further transducer 29. Input rod 42 of transducer 41 is slidably engaged in an aperture in a bracket 43 secured to one side of the engine 12. A shock absorbing rubber 44 on input rod 42 is disposed between bracket 43 and a shoulder (not shown) on input rod 42.

In use, tube 28, reservoir 24 and the corresponding reservoirs in transducers 29 and 41 are filled with hydraulic fluid. The spring 26 within transducer 20 serves to pressurise the system so that the input rods 30 and 42 of respective transducers 29 and 41 are urged to the right as viewed in FIG. 1 until abutment of the respective shoulders thereon through the intermediary of the respective shock absorbing rubbers against arm 31 and bracket 43 respectively, occur. If the pressure within tube 28 decreases as a result of an increased load on the rear of the motor vehicle body 10, a decrease in pressure within reservoir 24 occurs. This has the result that spring 26 within transducer 20 is permitted to expand, thereby urging ball 25 and output rod 19 to the left as viewed in FIGS. 3 and 4 or downwardly as viewed in FIG. 1. Such movement of output rod 19 produces a corresponding movement of rod 15 because of the connection therebetween via plate 18 and ball and socket joints 17. This movement of rod 15 serves to decrease the angle between respective links 21 and 22 and causes the respective headlamps 13 to be tilted downwardly by an amount which compensates for the change in the attitude of the vehicle body relative to the wheels so as to maintain the beams projected by the headlamps 13 in use at the desired level in spite of the increased loading at the rear of the motor vehicle body. It will be manifest that each link 21 is pivotally attached to its respective headlamps 13 at a location which is disposed below the respective pivot axes 14.

In the event that the load on the rear of the vehicle body 10 is lightened, an increased pressure within tube 28 occurs which results in an increase in the pressure within reservoir 24. This has the effect of compressing spring 26 and moving output rod 19 to the right as viewed in FIGS. 3 and 4 or upwardly as viewed in FIG. 1. Such movement effects a corresponding movement of rod 15 and an increase in the angle between respective links 21 and 22. Thus, the headlamps 13 are tilted upwardly about their respective axes to compensate for the lightening of the load at the rear of the vehicle body 10.

In the event that the motor vehicle is subjected to relatively heavy braking in use, the engine 12, being resiliently mounted, moves foward relative to the vehicle body 10. Such movement of the engine 12 also causes forward movement of bracket 43 with the result that the flexible walled reservoir within transducer 41 is compressed thus increasing the pressure within further tube 40. This increase in pressure within further tube 40 is transmitted to reservoir 24 within transducer 20 by way of tube 28 with a result that output rod 19 moves to the right as viewed in FIGS. 3 and 4 or upwardly as viewed in FIG. 1 to cause upward tilting of the headlamps by an amount which compensates for dipping of the front end of the vehicle body 10 under braking conditions.

Conversely, if, during use, the motor vehicle is subjected to heavy acceleration, the engine 12 moves a small distance rearwardly of the vehicle body 10 as a result of its inertia and causes the bracket 43 to move rearwardly relative to vehicle body 10. Such movement of bracket 43 relieves the pressure on input rod 42 and thereby reduces the pressure within the flexible walled reservoir in transducer 41. Such reduction of pressure produces a corresponding reduction of pressure in reservoir 24 and a resultant expansion of spring 26 to move output rod 19 to the left as viewed in FIGS. 3 and 4 or downwardly as viewed in FIG. 1. This causes the headlamps 13 to tilt downwardly by an amount sufficient to compensate for lifting of the front of the vehicle body under acceleration conditions.

It has been found that the transversely movable rod 15 and links 21 and 22 can have use on motor vehicles whose design does not permit the use of an angularly movable cross-rod upon which the headlamps are mounted.

I claim:

1. A motor vehicle including a vehicle body, a pair of headlamps mounted on said vehicle body for pivotal movement about a horizontal axis, said headlamps being spaced apart transversely of the longitudinal axis of said vehicle body, and means for effecting pivotal movement of said headlamps, said means including an elongate element extending between said headlamps, said elongate elements being slidable transversely relative to said longitudinal axis of said vehicle body and along its own longitudinal axis, said means further including a linkage attached to each end of said elongate element and to an adjacent one of said pair of headlamps, said linkages being arranged so that longitudinal movement of said element causes simultaneous pivotal movement of said headlamps.

2. The motor vehicle according to claim 1, wherein said means for effecting pivotal movement of said headlamps includes a transducer having a mechanical output operably connected with said element, said transducer having a hydraulic input.

3. The motor vehicle according to claim 2, wherein said transducer includes a housing within which is disposed a reservoir having a flexible wall, an inlet to said reservoir defining said hydraulic input, and said output comprises a rod extending into said housing and slidable relative thereto in response to flexure of said flexible wall.

4. The motor vehicle according to claim 1, wherein said elongate element is in the form of a rod which is slidable in bushes relative to said vehicle body.

5. The motor vehicle according to claim 4, wherein said rod is split intermediate said headlamps and the split ends are connected to a common operating member by means of respective joints.

6. The motor vehicle according to claim 1, wherein each linkage comprises a pair of links disposed on opposite sides of said elongate element, one of said links being pivotally attached at one of its ends to the respective headlamp and at the other of its ends to the respective end of said elongate element, and the other of said links being pivotally attached at one of its ends to said vehicle body and at the other of its ends to said respective end of said elongate element.

* * * * *